United States Patent
Kreuzer

(10) Patent No.: US 10,722,949 B2
(45) Date of Patent: Jul. 28, 2020

(54) COUPLING FOR CONNECTING AN INTERCHANGEABLE TOOL HEAD TO A MACHINE PART OF A PRESSING DEVICE

(71) Applicant: Von Arx AG, Sissach (CH)

(72) Inventor: Rudolf Kreuzer, Buchs (CH)

(73) Assignee: VON ARX AG (CH)

( * ) Notice: Subject to any disclaimer, the term of this patent is extended or adjusted under 35 U.S.C. 154(b) by 134 days.

(21) Appl. No.: 16/022,608

(22) Filed: Jun. 28, 2018

(65) Prior Publication Data

US 2019/0009346 A1 Jan. 10, 2019

(30) Foreign Application Priority Data

Jul. 7, 2017 (EP) .................................... 17180322

(51) Int. Cl.
  *B23B 31/113* (2006.01)
  *H01R 43/048* (2006.01)

(52) U.S. Cl.
  CPC ......... *B23B 31/113* (2013.01); *B23B 2240/04* (2013.01); *B23B 2260/136* (2013.01); *H01R 43/048* (2013.01); *Y10T 279/17888* (2015.01)

(58) Field of Classification Search
  CPC ............... B23B 31/113; B23B 2240/04; Y10T 279/17863; Y10T 279/17888
  See application file for complete search history.

(56) References Cited

U.S. PATENT DOCUMENTS

| | | | |
|---|---|---|---|
| 3,564,969 A * | 2/1971 | Kimmelaar ........... | B23B 31/113 409/232 |
| 4,836,706 A * | 6/1989 | Mitchell ............... | B23B 29/046 403/24 |
| 4,906,147 A * | 3/1990 | Friesinger ............. | B23B 31/113 279/97 |
| 5,018,266 A * | 5/1991 | Hutchinson ........... | B23B 31/113 483/1 |
| 5,037,254 A * | 8/1991 | Asberg .................... | B23B 31/02 279/46.8 |
| 5,316,323 A * | 5/1994 | Jovanovic ........... | B23B 31/1071 279/22 |
| 6,176,655 B1 * | 1/2001 | Ostermeier ........... | B23B 31/113 408/239 R |

(Continued)

FOREIGN PATENT DOCUMENTS

DE    102016202831    8/2016

OTHER PUBLICATIONS

Search Report dated Jan. 31, 2018; Application No. EP-17180322.4; 5 pages.

*Primary Examiner* — Eric A. Gates
(74) *Attorney, Agent, or Firm* — Rankin, Hill & Clark LLP; .Mary E. Bandy

(57) ABSTRACT

A coupling is described for connecting an interchangeable tool head to a machine part of a pressing device. The machine part features a receptacle region (A) for accommodating a shaft section of an interchangeable tool head, which can be axially displaced in the receptacle region (A), and the shaft section comprises an end face (S) and at least two engaging elements. The at least two holding elements are arranged in the receptacle region (A) and a guide groove is respectively formed between two adjacent holding elements. Also described are tools such as pressing devices utilizing the couplings and related methods.

12 Claims, 4 Drawing Sheets

(56) References Cited

U.S. PATENT DOCUMENTS

| | | | |
|---|---|---|---|
| 6,254,303 B1 * | 7/2001 | Falat | B23B 31/113 403/321 |
| 9,527,139 B2 * | 12/2016 | Mellstrom | B23Q 1/0081 |
| 9,629,640 B2 * | 4/2017 | Stern | A61B 17/162 |
| 2005/0218758 A1 | 10/2005 | Thackery et al. | |
| 2013/0264085 A1 | 10/2013 | Ciotti | |
| 2015/0104264 A1 * | 4/2015 | Vogel | B23B 31/005 408/204 |
| 2016/0318107 A1 * | 11/2016 | Mauch | B23B 31/201 |
| 2019/0022766 A1 * | 1/2019 | Koslowski | B23B 51/0406 |

* cited by examiner

COUPLING FOR CONNECTING AN INTERCHANGEABLE TOOL HEAD TO A MACHINE PART OF A PRESSING DEVICE

TECHNICAL FIELD

The present invention pertains to a coupling for connecting an interchangeable tool head to a machine part of a pressing device as well as to a method for actuating the coupling for connecting an interchangeable tool head to a machine part of a pressing device.

BACKGROUND

Pressing devices are used for various purposes such as, for example, for crimping cable lugs on electrical cables, but also for cutting cables or for punching holes into sheet metal constructions. In order to realize these different applications in one machine, a system for interchanging a head provided with the respective tool is required. For the sake of simplicity, the different attachable heads are simply referred to as interchangeable heads below. The same pressing device can be easily and quickly adapted to other applications on demand with the aid of different interchangeable heads.

However, one particular problem of pressing devices with interchangeable heads are the longitudinal forces to be transmitted, i.e. the compressive forces or pressures generated by the pressing devices, which the coupling mechanism has to withstand. In this context, conventional longitudinal forces lie in the range, for example, between 24 kN and 130 kN.

The aim therefore is to develop a coupling mechanism that can be easily and quickly handled, but nevertheless also operates reliably under very high longitudinal forces.

For example, document US 2013/0264085 A1 discloses a coupling for connecting an interchangeable tool head to a machine part of a pressing device, in which high longitudinal forces consequently also act upon the coupling mechanism.

US 2013/0264085 A1 furthermore discloses a cylindrical shaft section on the part of the pressing device on the machined side, wherein the shaft section can be accommodated in a corresponding receptacle region of an interchangeable tool head and is axially displaceable therein. A plurality of interlocking lugs is arranged in the receptacle region of the interchangeable tool head, as well as on the circumferential surface of the shaft section. A closed position can be adjusted by rotating the interchangeable tool head and thereby lining up the interlocking lugs in the receptacle region with the interlocking lugs on the shaft section. In the closed position, the interchangeable tool head can be prevented from separating from the machine part. An open position, in which the interchangeable tool head can be separated from the machine part, can be adjusted in at least one angular position by rotating the interchangeable tool head. In other words, a bayonet joint is formed between the interchangeable tool head and the machine part.

In the coupling known from US 2013/0264085 A1, the shaft section consists of two parts, namely of a hollow cylinder and a piston that can be displaced therein, wherein a spring located in the shaft section causes the piston to retract into the hollow cylinder when hydraulic pressure is released.

Due to the two-part construction of its shaft section, the coupling in the form of a bayonet joint known from US 2013/0264085 A1 has a comparatively complicated design.

There basically is an ongoing demand to additionally improve the operational reliability of the coupling mechanism in pressing devices with high longitudinal forces.

SUMMARY

The present invention therefore aims to make available a coupling for connecting an interchangeable tool head to a machine part of a pressing device, wherein the coupling has the simplest design possible, can be easily and quickly handled and its operational reliability is also additionally improved under very high longitudinal forces.

This objective is attained by means of a coupling for connecting an interchangeable tool head to a machine part of a pressing device with the characteristics of claim 1.

The solution is basically characterized in that the machine part, i.e. the part of the pressing device on the machine side, features a single compression spring that is located in a receptacle region, and in that the compression spring is arranged in such a way that the compression spring can be functionally connected to the shaft section of the interchangeable tool head by inserting the shaft section into the receptacle region, wherein a respective engaging element of the interchangeable tool head can in the closed position be pressed on an engaging zone of a respective holding element due to the effect of the spring force of the compression spring on the interchangeable tool head such that the compression spring can act as a safety spring for securing the closed position whereas the compression spring can act as an ejection spring in the open position.

In the context of the present invention, a functional connection between the compression spring and the shaft section of the interchangeable tool head means that the effect of the spring force can be exerted due to the direct contact of the compression spring with the end face of the shaft section of the interchangeable tool head, wherein the effect of the spring force can also be exerted upon the end face of the shaft section of the interchangeable tool head by means of an intermediate element.

In the context of the present invention, an open position of the shaft section of the interchangeable tool head, which is adjusted by means of the inventive coupling, means that the shaft section of the interchangeable tool head is axially displaceable in the receptacle region of the machine part, i.e. that the shaft section of the interchangeable tool head can be ejected from the receptacle region of the machine part.

Furthermore, a closed position of the shaft section of the interchangeable tool head, which is adjusted by means of the inventive coupling, means that the axial displaceably of the shaft section of the interchangeable tool head is blocked in the receptacle region of the machine part.

Due to the spring arrangement in the coupling according to the present application, the closed position is advantageously improved and the operational reliability is thereby increased by means of a single compression spring such that a simple design is simultaneously achieved.

Another advantage of the inventive coupling can be seen in that the interchangeable tool head can be installed on the machine part of the pressing device without the aid of auxiliary tools.

Other advantageous embodiments are disclosed in the dependent claims.

According to a preferred enhancement of the present invention, the inventive coupling comprises a spring washer, which is arranged in the receptacle region on the side of the compression spring that faces the holding elements, wherein the compression spring and the spring washer are arranged in the receptacle region of the machine part and dimensioned in such a way that the spring washer can be at least sectionally brought in contact with the end face of the shaft section of the interchangeable tool head inserted into the receptacle region (i.e. that a common contact surface can be formed) in order to thereby indirectly produce a functional connection and to transmit the spring force originating from the compression spring to the end face of the shaft section of the interchangeable tool head.

It is furthermore preferred that the at least two holding elements on the machine part respectively comprise engaging edges that are located on the two circumferential ends and extend toward the compression spring in the direction of the longitudinal axis of the machine part. Due to these engaging edges, it is not only necessary to rotate the interchangeable tool head, but also to overcome the spring force of the compression spring in the axial direction in accordance with the longitudinal extent of the engaging edges in order to change over from the closed position into the open position and vice versa. Consequently, the closed position advantageously can be additionally secured and the operational reliability can be increased by means of said engaging edges.

It is particularly preferred that the inventive coupling comprises at least three engaging elements, particularly four engaging elements, which are arranged on the shaft section of the interchangeable tool head, i.e., fixed or integrally formed on said shaft section, as well as the same number of holding elements (i.e. at least three holding elements, particularly four holding elements), which correspond to the engaging elements and are arranged in the receptacle region of the machine part, i.e., fixed or integrally formed on the inner walls of the hollow-cylindrical section of the machine part.

The compression spring is preferably realized in the form of an annular, rotationally symmetrical spring with an undulating structure. However, it would alternatively also be conceivable that the compression spring is realized, for example, in the form of an annular disk spring or in the form of a coil spring.

Another aspect of the present invention pertains to a pressing device that at least comprises: a machine part, an interchangeable tool head with a shaft section and the inventive coupling.

Another aspect of the present invention pertains to a method for actuating a coupling for connecting an interchangeable tool head to a machine part of a pressing device, wherein said method comprises the steps of:

(1) inserting the shaft section of the interchangeable tool head into the receptacle region of the machine part into the open position, in which the spring washer at least sectionally contacts the end face of the shaft section of the interchangeable tool head, in a suitable angular position;

(2) pressing the shaft section against the spring washer such that the compression spring is compressed at least to a degree that makes it possible to move the shaft section toward the machine part in the direction of the longitudinal axis by a distance corresponding to the longitudinal extent of an engaging edge;

(3) rotating the shaft section into the closed position about the rotational axis $D_R$ in the arrow direction $P_2$ while simultaneously pressing on the shaft section, namely up to an angular position, in which the engaging elements are lined up with the holding elements between the two engaging edges of a respective holding element, wherein a respective engaging element is pressed on the engaging zone of a respective holding element due to the spring force of the compression spring and the compression spring can thereby act as a safety spring for securing the closed position.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

A preferred exemplary embodiment of the object of the invention is described below with reference to the attached drawings. In these drawings.

DETAILED DESCRIPTION OF THE EMBODIMENTS

Figure 1:
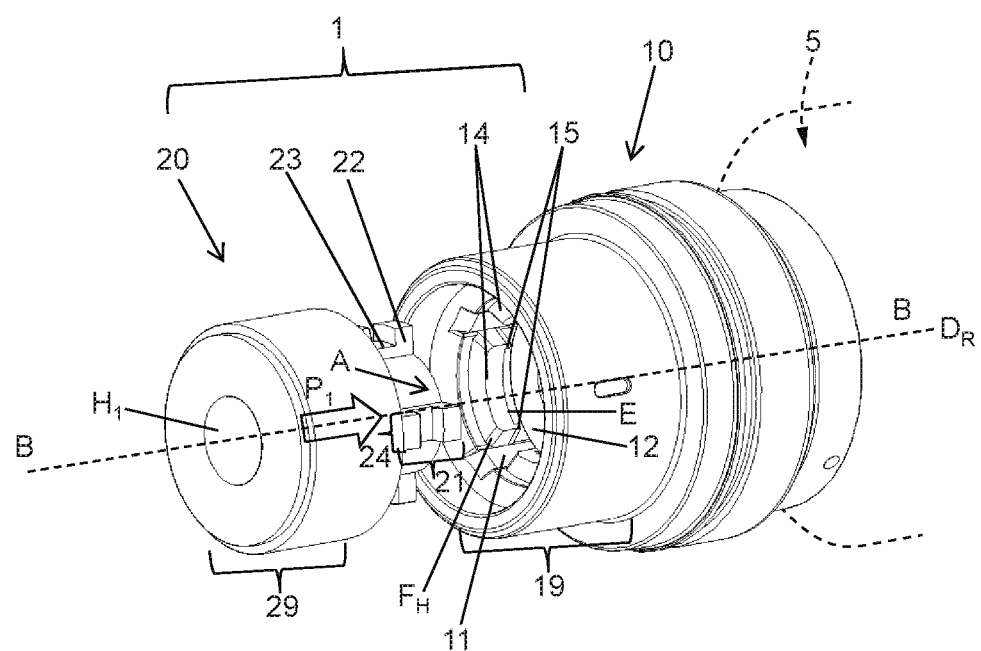
FIG. 1 shows a perspective view of a preferred embodiment of the inventive coupling of a pressing device.

FIG. 1 shows a perspective view of a preferred embodiment of the inventive coupling 1 for connecting an interchangeable tool head 20 to a machine part 10 of a pressing device. For the sake of simplicity, the tool on the interchangeable tool head 20 and the energy supply, etc., on the machine part 10 were omitted in this significantly simplified view. The coupling 1 makes it possible to separably connect and therefore couple and decouple the interchangeable tool head 20 to/from the machine part 10 of the pressing device.

The respective tool on the interchangeable tool head 20 to be attached can be operated by means of the machine part 10, wherein the machine part 10 may be designed, for example, for operating by means of a hydraulic fluid.

The machine part 10 features a receptacle region A for accommodating a shaft section 21 of the interchangeable tool head 20, which can be displaced in the receptacle region A axially, i.e. in the direction of the rotational axis $D_R$. When the shaft section 21 is inserted, the longitudinal axes of the shaft section 21 and of the machine part 10 correspond to a common rotational axis $D_R$. In this case, the receptacle region A is formed by the inner walls of a hollow-cylindrical section 19 of the machine part 10. According to FIG. 1, the machine part 10 features four holding elements 14, which are distributed over the circumference of the inner walls and correspond to the engaging elements 22 on the shaft section 21, in the receptacle region A, i.e. on the inner walls of the hollow-cylindrical section, as well as respective guide grooves 11 formed between two adjacent holding elements 14. In the preferred exemplary embodiment illustrated in FIG. 1, the engaging elements 22, as well as the corresponding holding elements 14, are respectively arranged symmetrically or within regular angular distances such that the shaft section 21 of the interchangeable tool head 20 can, referred to the rotational axis $D_R$, be inserted into the receptacle region A of the machine part 10 in the arrow direction $P_1$ in four possible angular positions.

It would alternatively be conceivable to arrange the engaging elements 22 and the corresponding holding elements 14 asymmetrically such that, for example, the shaft section 21 of the interchangeable tool head 20 can, referred to the rotational axis $D_R$, respectively be inserted into or aligned with the receptacle region A of the machine part 10 in the arrow direction $P_1$ in only one possible angular position.

According to a preferred enhancement of the inventive coupling 1, it would furthermore be conceivable to advantageously realize the inventive coupling in such a way that only an intended interchangeable tool head 20 can be coupled to the machine part 10, namely by means of different circumferences of the circumferential surface of the interchangeable tool head 20 and the inner walls of the hollow-cylindrical section of the machine part 10 and/or by means of different shapes and numbers of the engaging elements 22 and the corresponding holding elements 14.

In this way, it can be ensured that only an interchangeable tool head 20 designed for longitudinal forces of 24 kN, but not an interchangeable tool head 20 designed for 130 kN, can be coupled to a machine part 10 designed for longitudinal forces of 24 kN.

Figure 2:
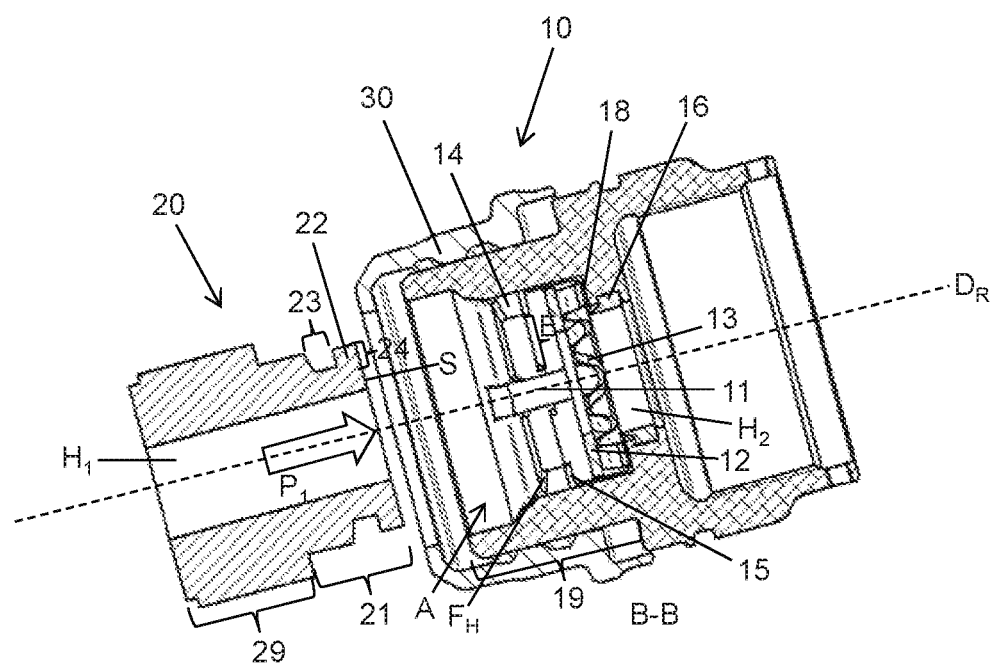
FIG. 2 shows a longitudinal section B-B through the inventive coupling of a pressing device illustrated in FIG. 1, wherein the interchangeable tool head is separated from the machine part of the pressing device.

The machine part 10 furthermore comprises a spring washer 12 and a compression spring (see FIG. 2).

The four holding elements 14 respectively comprise engaging edges 15, which are located on both circumferential ends and respectively extend toward the compression spring 13 (see FIG. 2) and toward the spring washer 12 in the direction of the rotational axis $D_R$.

The interchangeable tool head 20 comprises the cylindrical shaft section 21, as well as a transition element 29 to the tool, wherein the shaft section 21 of the interchangeable tool head 20, as well as its transition element 29, features a cylindrical hollow space $H_1$ that extends in the direction of the rotational axis $D_R$ and serves as a channel K for transmitting the force, e.g., by means of a not-shown piston.

The cylindrical shaft section 21 of the interchangeable tool head 20 comprises an end face S, as well as four engaging elements 22 that are formed on the circumferential surface and distributed over the circumference. According to FIG. 1, four ribs 24 are integrally formed on the circumferential surface of the shaft section 21 such that they extend parallel to the longitudinal axis of the shaft section 21 and up to the end face S, wherein a groove 23 is respectively recessed and the four engaging elements 24 are formed between a groove 23 and the end face S. In this case, the engaging elements 22 are arranged on the end of the shaft section 21, i.e., the engaging elements 22 are aligned flush with the surface of the end face S.

Referred to the circumferential direction, the guide grooves 11, which extend between two adjacent holding elements 14 parallel to a longitudinal axis of the machine part 10, have at least the same dimensions as the engaging elements 22 such that the shaft section 21 of the interchangeable tool head 20 can, referred to the direction of the rotational axis $D_R$, be inserted into the receptacle region A of the machine part 10 in the arrow direction $P_1$ in four possible angular positions. In order to simplify the insertion of the shaft section 21 of the interchangeable tool head 20 in the region of the guide grooves 11, the holding elements 14 respectively feature bevels $F_H$, which lie opposite of engaging edges 15, i.e. face away from the compression spring, on both of their circumferential ends. An engaging zone E is formed on the side of the holding elements 14, which respectively faces the compression spring 13 or the spring washer 12, between the two engaging edges 15 of each holding element 14.

It was determined that such an arrangement with at least three engaging elements 22, in this case four engaging elements, and the same number of holding elements 14, in this case four holding elements, makes it possible to reliably transmit the occurring longitudinal forces.

From this point forward, identical components in the figures are identified by the same reference symbols.

FIG. 2 shows a longitudinal section B-B through the coupling 1 of a pressing device illustrated in FIG. 1, wherein the interchangeable tool head 20 is separated from the machine part 10 of the pressing device, i.e., prior to the insertion into the receptacle region A of the machine part 10 in the arrow direction $P_1$.

Other details regarding the spring arrangement of the inventive coupling 1 can be gathered from the longitudinal section B-B illustrated in FIG. 2. According to FIG. 2, the machine part 10 may be surrounded by a protective cap 30 in the region of the hollow-cylindrical section 19.

The machine part 10 comprises the compression spring 13 and the spring washer 12, which is arranged on the side of the compression spring 13 that faces the holding elements 14.

The compression spring 13 is in this case supported between one face of the spring washer 12 and a stopping face 18 of the machine part 10 and can act upon the spring washer 12. The compression spring 13 can thereby be deflected in the axial direction, i.e., parallel to the direction of the rotational axis $D_R$, and the compression spring 13 axially presses the spring washer 12 away from the stopping face 18 parallel to the direction of the rotational axis $D_R$ in the installed state. In this case, the compression spring 13 is held in its position by means of a fixing ring 16 and simultaneously serves as a sliding aid for the engaging elements 22. It was advantageously determined that the spring washer 12 above the fixing ring 16 also holds the engaging elements 22 in the closed position illustrated in FIG. 3, i.e. in the engaged position, without an additional force.

Figure 3:
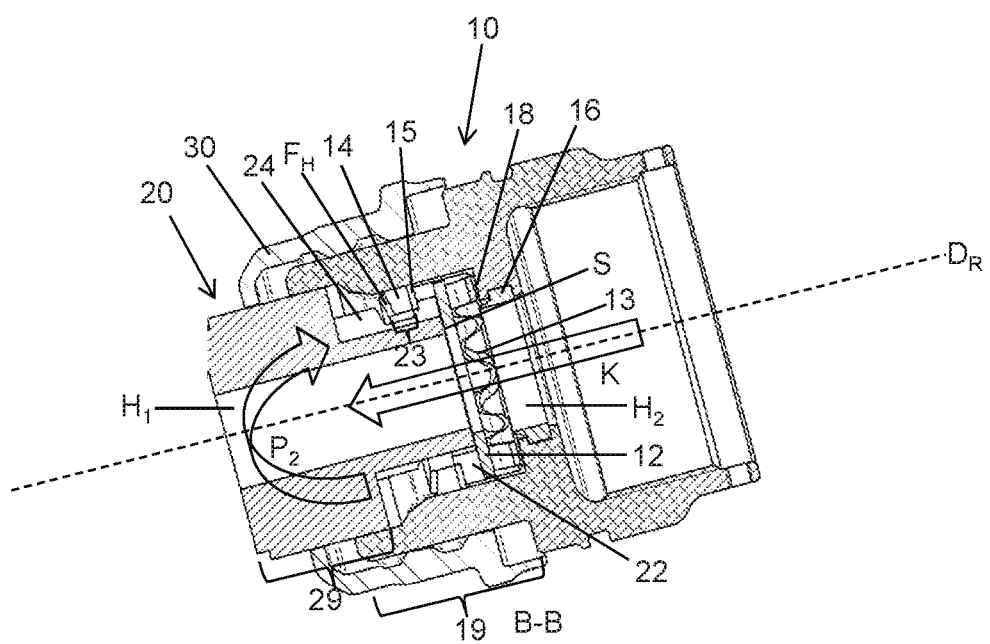
FIG. 3 shows a longitudinal section B-B through the inventive coupling of a pressing device, wherein the inventive coupling is in a closed position.

FIG. 3 shows a longitudinal section B-B through the inventive coupling 1 of a pressing device, wherein the inventive coupling 1 is in a closed position.

Figure 4:
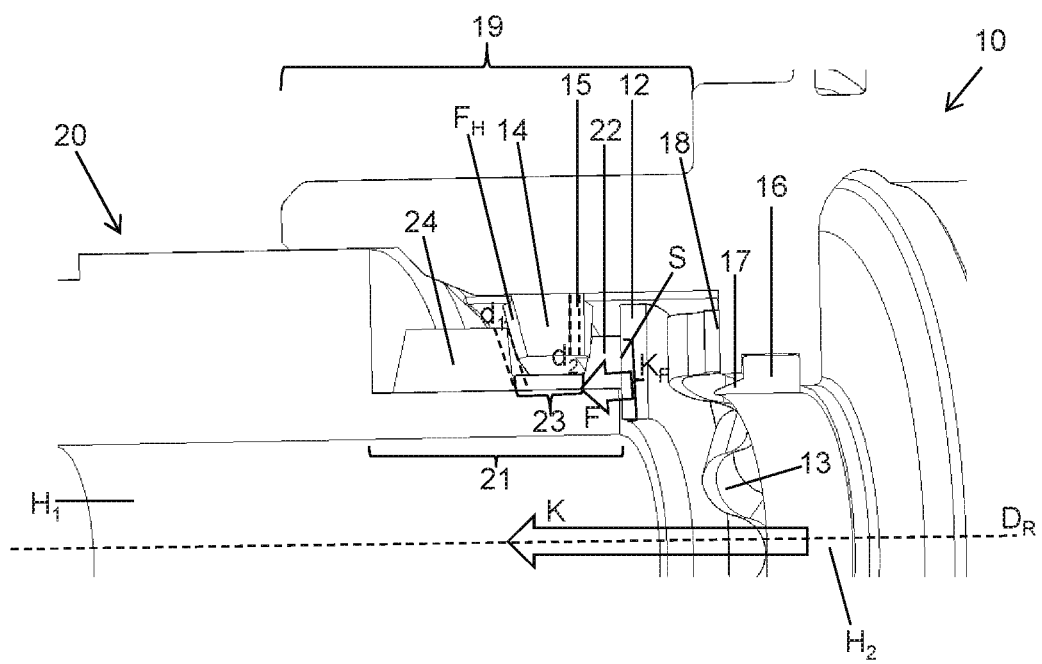
FIG. 4 shows a detailed view of the closed position of the inventive coupling, which is illustrated in the form of a longitudinal section B-B in FIG. 3.

An arrow in FIG. 3 indicates that the coupling 1 can be changed over from the open position into the closed position by rotating the interchangeable tool head 20 in the arrow direction $P_2$ and simultaneously compressing and overcoming the spring force F of the compression spring 13 by at least a distance $d_2$ corresponding to the longitudinal extent of the engaging edge 15 in the direction of the rotational axis $D_R$ (see FIG. 4).

In the closed position of the coupling 1 illustrated in FIG. 3, the holding elements 14 are accommodated in the guide grooves 23, wherein the engaging elements 22 of the shaft section 21 are pressed on the engaging zones of the holding elements 14 of the interchangeable tool head 20 due to the spring force F of the compression spring 13.

The spring washer 12 is respectively arranged in such a way that the spring washer 12 can in the open position or in the closed position (i.e. when the shaft section 21 is completely inserted into the receptacle region A) be at least sectionally brought in contact with the end face S of the shaft section 21 of the interchangeable tool head 20 or a contact surface $K_F$ between the end face S of the shaft section 21 and the spring washer 12 is formed (see detailed view in FIG. 4).

The design of a channel K for the force transmission, which extends from a hollow space $H_2$ of the machine part 20 up to the hollow space $H_1$ of the shaft section 21, can be gathered from the closed position of the coupling 1 illustrated in FIG. 3. In the closed position, this channel K has a suitable fixed length in order to obtain the desired displacement, for example, of a not-shown piston.

FIG. 4 shows a detailed view of the inventive coupling 1, which is illustrated in the form of a longitudinal section B-B in the closed position in FIG. 3.

The structure and the arrangement of the compression spring 13 in the form of an annular, rotationally symmetrical spring with an undulating structure, preferably a wave spring made of spring steel, can be gathered from this detailed view, wherein the compression spring 13 is referred to the direction of the rotational axis $D_R$ positioned between the fixing ring 16 arranged on the side of the machine part and the annular spring washer 12 arranged on the side of the interchangeable head. It would alternatively also be conceivable to utilize a plurality of compression or pressure springs rather than just one compression or pressure spring.

In this case, the fixing ring 16 features a fixing edge 17 extending toward the compression spring 13 over its entire inside circumference, wherein the fixing edge 17 causes the compression spring 13 to be fixed in its position.

The spring washer 12 sectionally contacts the end face S of the shaft section 21 of the interchangeable tool head 20 in the region of the contact surface $K_F$ and transmits the spring force F originating from the compression spring 13 to the end face S of the shaft section 21 of the interchangeable tool head 20. In the closed position illustrated in FIG. 4, the engaging elements 22 of the shaft section 21 are thereby pressed on the engaging zones of the holding elements 14 of the interchangeable tool head 20 and advantageously secured in the closed position.

A difference between the longitudinal extent of a groove 23 and the longitudinal extent of an engaging element 22 in the direction of the rotational axis $D_R$ defines a distance $d_1$ whereas the longitudinal extent of the engaging edge 15 in the direction of the rotational axis $D_R$ defines a distance dz. In this case, $d_1 \geq d_2$ generally applies.

In a particular embodiment, a coupling 1 for connecting an interchangeable tool head 20 to a machine part 10 of a pressing device is provided. The machine part 10 features a receptacle region (A) for accommodating a shaft section 21 of an interchangeable tool head 20, which can be axially displaced in the receptacle region (A). And the shaft section 21 comprises an end face (S) and at least two engaging elements 22, in which at least two holding elements 14 are arranged in the receptacle region (A) and a guide groove 11 is respectively formed between two adjacent holding elements 14. The at least two engaging elements 22 are in an open position respectively lined up with a guide groove 11 and movable in the direction of a rotational axis ($D_R$), in which the at least two engaging elements 22 are in a closed position at least sectionally lined up with the at least two holding elements 14. The coupling can be changed over from the open position into the closed position by rotating the interchangeable tool head 20 such that a bayonet joint is formed between the shaft section 21 of the interchangeable tool head 20 and the machine part 10.

The invention aims to make available a coupling 1 for connecting an interchangeable tool head 20 to a machine part 10 of a pressing device, wherein the coupling has the simplest design possible, can be easily and quickly handled and its operational reliability is also additionally improved under very high longitudinal forces. This is achieved in that the machine part 10 features a compression spring 13, which is located in a receptacle region (A), and the compression spring 13 is arranged in such a way that the compression spring 13 can be functionally connected to the end face (S) of the shaft section 21 of the interchangeable tool head 20.

The coupling process by means of the inventive coupling 1 takes place in the following steps:

(1) inserting the shaft section 21 of the interchangeable tool head 20 into the receptacle region A of the machine part 10 into the open position, in which the spring washer 12 at least sectionally contacts the end face S of the shaft section 21 of the interchangeable tool head, in a suitable angular position;

(2) pressing the shaft section 21 against the spring washer such that the compression spring is compressed at least to a degree that makes it possible to move the shaft section 21 toward the machine part 10 by the distance $d_2$;

(3) rotating the shaft section 21 into the closed position in the arrow direction $P_2$ while simultaneously pressing on the shaft section 21, namely up to an angular position, in which the engaging elements 22 are lined up with the holding elements 14 between the two engaging edges 15 of a respective holding element 14, wherein the engaging elements 22 are pressed on the engaging zones E of the respective holding elements 14 due to the spring force F of the compression spring 13 and thereby secured in the closed position.

Many other benefits will no doubt become apparent from future application and development of this technology.

All patents, applications, standards, and articles noted herein are hereby incorporated by reference in their entirety.

The present subject matter includes all operable combinations of features and aspects described herein. Thus, for example if one feature is described in association with an embodiment and another feature is described in association with another embodiment, it will be understood that the present subject matter includes embodiments having a combination of these features.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scope of the claimed subject matter, as expressed in the appended claims.

REFERENCE LIST

1 Coupling
5 Pressing device
10 Machine part
11 Guide groove
12 Spring washer
13 Compression spring
14 Holding element
15 Engaging edge
16 Fixing ring (for fixing the compression spring)
17 Fixing edge (of fixing ring)
18 Stopping face
19 Hollow-cylindrical section (of machine part)
20 Interchangeable tool head
21 Shaft section
22 Engaging element
23 Groove (in rib of the shaft section)
24 Rib (on shaft section)

29 Transition element (to tool of the interchangeable tool head)
30 Protective cap
$d_1$ Distance
$d_2$ Distance
$D_R$ Rotational axis
E Engaging zone
F Spring force (of compression spring)
$F_H$ Bevel (on circumferential end of the holding elements)
$H_1$ Hollow space (in shaft section of the interchangeable tool head)
$H_2$ Hollow space (in machine part)
K Channel
$P_1$ Arrow direction (insertion of interchangeable tool head)
$P_2$ Arrow direction (rotation between open position and closed position)
S End face

What is claimed is:

1. A coupling for connecting an interchangeable tool head to a machine part of a pressing device,
wherein the machine part defines a receptacle region (A) for accommodating a shaft section of the interchangeable tool head, which can be axially displaced in the receptacle region (A), and the shaft section comprises an end face (S) and at least two engaging elements,
wherein at least two holding elements are arranged in the receptacle region (A) and a guide groove is respectively formed between two adjacent holding elements,
wherein the at least two engaging elements are in an open position, respectively lined up with the guide groove and movable in the direction of a rotational axis ($D_R$),
wherein the at least two engaging elements are in a closed position at least sectionally lined up with the at least two holding elements in respective engaging zones (E) of the holding elements, and
wherein the shaft section can be changed from the open position into the closed position by rotating the interchangeable tool head such that a bayonet joint is formed between the shaft section of the interchangeable tool head and the machine part,
wherein the machine part includes a compression spring, which is located in the receptacle region (A), and the compression spring is arranged such that the compression spring can be functionally connected to the end face (S) of the shaft section of the interchangeable tool head, wherein a respective engaging element of the shaft section of the interchangeable tool head can in the closed position be pressed on the engaging zone (E) of a respective holding element due to the effect of the spring force (F) of the compression spring on the interchangeable tool head such that the compression spring can act as a safety spring for securing the closed position whereas the compression spring can act as an ejection spring in the open position,
wherein the coupling comprises a spring washer, which is arranged in the receptacle region (A) on the side of the compression spring that faces the holding elements, wherein the compression spring and the spring washer are arranged in the receptacle region (A) of the machine part and dimensioned in such a way that the spring washer can be at least sectionally brought in contact with and thereby functionally connected to the end face (S) of the shaft section of the interchangeable tool head.

2. The coupling for connecting an interchangeable tool head to a machine part of a pressing device according to claim 1,
wherein the at least two holding elements respectively comprise engaging edges, which are located on two circumferential ends and extend toward the compression spring in the direction of the rotational axis ($D_R$).

3. The coupling for connecting an interchangeable tool head to a machine part of a pressing device according to claim 1,
wherein the compression spring is in the form of an annular, rotationally symmetrical spring with an undulating structure.

4. The coupling for connecting an interchangeable tool head to a machine part of a pressing device according to claim 1,
wherein the coupling comprises at least three engaging elements, which are arranged on the shaft section of the interchangeable tool head, and the coupling further comprises the same number of engaging elements, which correspond to the engaging elements and are arranged in the receptacle region of the machine part.

5. The coupling for connecting an interchangeable tool head to a machine part of a pressing device according to claim 4,
wherein the coupling comprises four engaging elements.

6. The coupling for connecting an interchangeable tool head to a machine part of a pressing device according to claim 4,
wherein the coupling comprises at least three holding elements.

7. The coupling for connecting an interchangeable tool head to a machine part of a pressing device according to claim 4,
wherein the coupling comprises four holding elements.

8. A coupling for connecting an interchangeable tool head to a machine part of a pressing device,
wherein the machine part defines a receptacle region (A) for accommodating a shaft section of the interchangeable tool head, which can be axially displaced in the receptacle region (A), and the shaft section comprises an end face (S) and at least two engaging elements,
wherein at least two holding elements are arranged in the receptacle region (A) and a guide groove is respectively formed between two adjacent holding elements,
wherein the at least two engaging elements are in an open position, respectively lined up with the guide groove and movable in the direction of a rotational axis ($D_R$),
wherein the at least two engaging elements are in a closed position at least sectionally lined up with the at least two holding elements in respective engaging zones (E) of the holding elements, and
wherein the shaft section can be changed from the open position into the closed position by rotating the interchangeable tool head such that a bayonet joint is formed between the shaft section of the interchangeable tool head and the machine part,
wherein the machine part includes a compression spring, which is located in the receptacle region (A), and the compression spring is arranged such that the compression spring can be functionally connected to the end face (S) of the shaft section of the interchangeable tool head, wherein a respective engaging element of the shaft section of the interchangeable tool head can in the closed position be pressed on the engaging zone (E) of a respective holding element due to the effect of the spring force (F) of the compression spring on the interchangeable tool head such that the compression spring can act as a safety spring for securing the closed position whereas the compression spring can act as an ejection spring in the open position, wherein at least two ribs are integrally formed on a circumferential surface of the shaft section such that they extend parallel to the direction of the rotational axis ($D_R$) and up to the end face (S), wherein a groove is recessed in each rib and the at least two engaging elements are respectively formed between the groove and the end face (S).

9. The coupling for connecting an interchangeable tool head to a machine part of a pressing device according to claim 8, wherein the difference between the longitudinal extent of the groove and the longitudinal extent of an engaging element in the direction of the rotational axis ($D_R$) defines a distance ($d_1$) whereas the longitudinal extent of the engaging edge in the direction of the rotational axis ($D_R$) defines a distance ($d_2$), and wherein $d_1 \geq d_2$.

10. The coupling for connecting an interchangeable tool head to a machine part of a pressing device according to claim 8, wherein the at least two holding elements respectively comprise engaging edges, which are located on two circumferential ends and extend toward the compression spring in the direction of the rotational axis ($D_R$).

11. The coupling for connecting an interchangeable tool head to a machine part of a pressing device according to claim 8, wherein the compression spring is in the form of an annular, rotationally symmetrical spring with an undulating structure.

12. The coupling for connecting an interchangeable tool head to a machine part of a pressing device according to claim 8, wherein the coupling comprises at least three engaging elements, which are arranged on the shaft section of the interchangeable tool head, and the coupling further comprises the same number of holding elements, which correspond to the engaging elements and are arranged in the receptacle region of the machine part.

* * * * *